US010810055B1

(12) United States Patent
Walker

(10) Patent No.: US 10,810,055 B1
(45) Date of Patent: Oct. 20, 2020

(54) REQUEST SIMULATION FOR ENSURING COMPLIANCE

(71) Applicant: Amazon Technologies, Inc., Reno, NV (US)

(72) Inventor: David Walker, Old Basing (GB)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 288 days.

(21) Appl. No.: 15/842,616

(22) Filed: Dec. 14, 2017

(51) Int. Cl.
*G06F 9/52* (2006.01)
*G06F 9/50* (2006.01)
*G06F 9/54* (2006.01)
*G06F 16/23* (2019.01)

(52) U.S. Cl.
CPC .............. *G06F 9/52* (2013.01); *G06F 9/5005* (2013.01); *G06F 9/54* (2013.01); *G06F 16/2358* (2019.01); *G06F 16/2379* (2019.01); *G06F 2209/508* (2013.01)

(58) Field of Classification Search
CPC .... G06F 9/52; G06F 16/2379; G06F 16/2358; G06F 9/5005; G06F 9/54; G06F 2209/508
See application file for complete search history.

(56) References Cited

U.S. PATENT DOCUMENTS

| | | | | |
|---|---|---|---|---|
| 2004/0205179 | A1* | 10/2004 | Hunt | G06F 8/65 709/223 |
| 2007/0150480 | A1* | 6/2007 | Hwang | G06Q 10/00 |
| 2014/0222521 | A1* | 8/2014 | Chait | G06Q 10/0637 705/7.36 |
| 2016/0124742 | A1* | 5/2016 | Rangasamy | H04L 47/70 717/103 |

* cited by examiner

*Primary Examiner* — Doon Y Chow
*Assistant Examiner* — Kimberly L Jordan
(74) *Attorney, Agent, or Firm* — Hogan Lovells US LLP

(57) ABSTRACT

Calls, such as API calls to a resource provider environment, can be modeled and evaluated using a shadow environment before executing the call in an actual target environment. Such an approach ensures that any changes made as a result of executing the call will not cause the actual environment to be out of compliance with any relevant rules or regulations. Changes may typically be reflected in a configuration management database. A shadow copy of this database can be generated, and the call can first be modeled in this shadow copy. Shadow log entries including results of the processing can be generated and evaluated. If the changes would be compliant then the call can be transmitted to the actual API endpoint for the target environment, where the API call can be executed.

20 Claims, 9 Drawing Sheets

REQUEST SIMULATION FOR ENSURING COMPLIANCE

BACKGROUND

Users are increasingly performing tasks using remote computing resources, which may be offered through a shared-resource environment. This has many advantages, as users do not have to purchase and maintain dedicated hardware and software, and instead can pay for only those resources that are utilized at any given time, where those resources typically will be managed by a resource provider. Users can perform tasks such as storing data or executing applications using various types of resources offered by the resource provider. In some environments there may be various compliance requirements with which the user must comply. In order to determine compliance, conventional approaches use a monitoring system to detect when an action or modification has caused the data or resources to go out of compliance. Such an approach is not optimal, however, as the system will be out of compliance for at least some period of time, which may result in penalties or a breach of contract, among other potential issues.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for the ensuring of compliance of a resource environment. In particular, various embodiments provide for the testing of a call, such as an API call, in a shadow or testing environment before executing the call in the target environment. Such an approach can ensure that any changes made as a result of executing the call would not cause the environment to be out of compliance with any rules or regulations, before the call is executed and would result in such non-compliance. In some embodiments the changes will be reflected in a configuration management database. A shadow copy of this database can be generated, and the call can first be modeled in this shadow copy. Shadow log entries including results of the processing on the shadow database can be generated and evaluated against the rules or regulations. If the changes would result in a non-compliant state, then the call can be aborted and an error message returned. If the changes are determined to result in a compliant state then the call, or a newly generated call for the same action, can be transmitted to the actual API endpoint for the target environment, where the API call can be executed.

Various other functions can be implemented within the various embodiments as well as discussed and suggested elsewhere herein.

Figure 1:
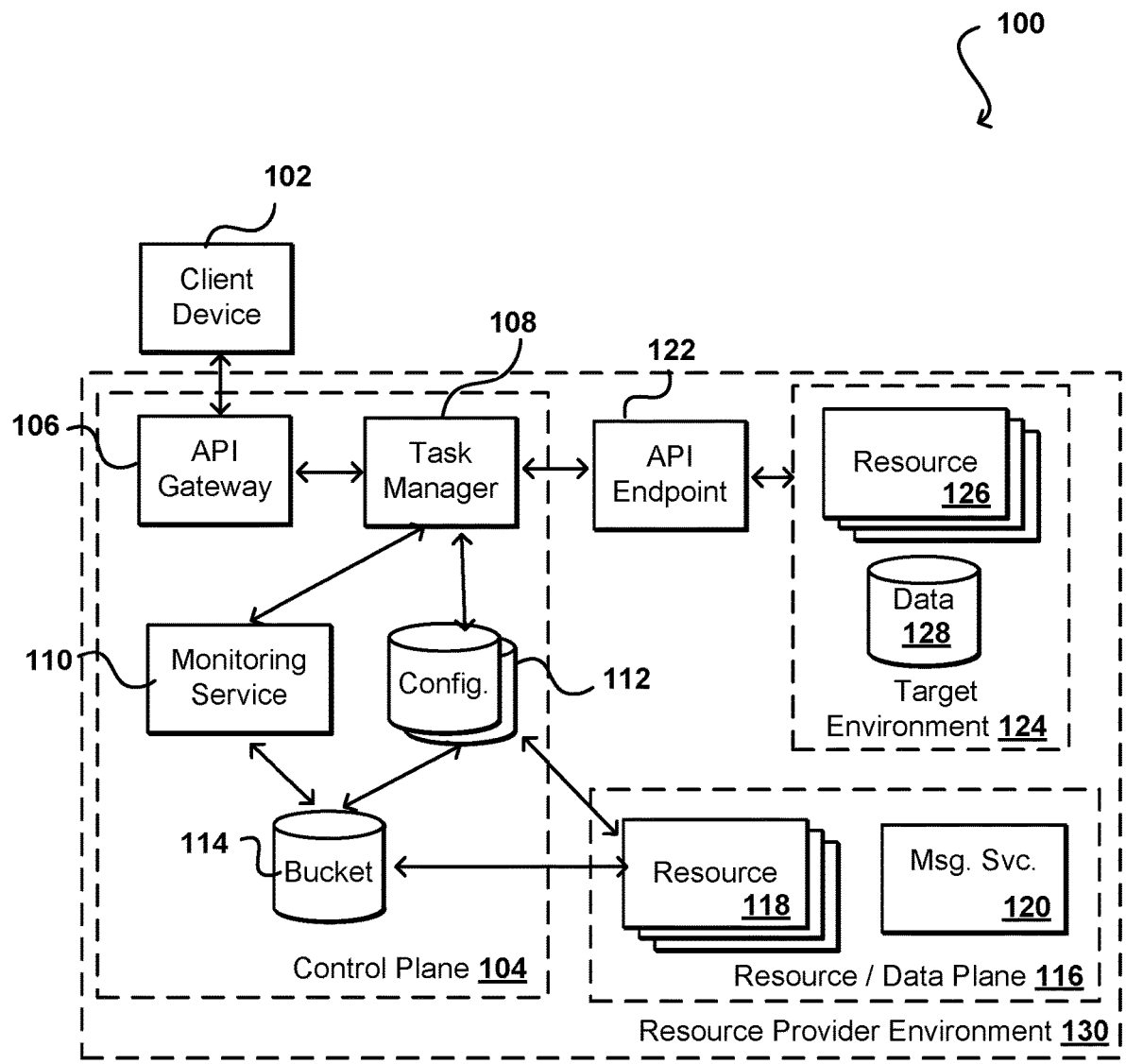
FIG. 1 illustrates an example system for ensuring compliance of a resource allocation that can be utilized in accordance with various embodiments.

FIG. 1 illustrates an example system 100 that can be utilized in accordance with various embodiments. In this example, a user (such as a customer of a resource provider) is able to utilize a client device 102 to submit requests across at least one network to a resource provider environment 130. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network (not shown in this figure) can include any appropriate network, including an intranet, the Internet, a cellular network, a local area network (LAN), or any other such network or combination, and communication over the network can be enabled via wired and/or wireless connections. The resource provider environment can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. The users may be associated with one or more customers, such as organizations or enterprises, having accounts with the resource provider in some embodiments. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources of one or more types. These types can include, for example, application servers operable to process instructions provided by a user or database servers operable to process data stored in one or more data stores in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

There will often be various requirements with which the resources must be in compliance. These can often involve client specifications or service level agreements, among other such options. For certain use cases, there may also be compliance regulations with which the customer and any utilized resources must comply. "Continuous Compliance" is a subject of increasing significance to many of customers, as compliance requirements are getting more broad and complex in scope, and the penalties for non-compliance are becoming increasingly difficult for businesses to risk or absorb. Many conventional continuous compliance approaches, such as Evident.io, Dome9 ARC, and CapitalOne Cloud Custodian, attempt to manage compliance through continuous monitoring. Such approaches monitor the relevant environment, and detect when the environment is out of compliance such that the non-compliance can be remedied. A downside to such an approach, however, is that the environment will be out of compliance for at least some period of time, and no matter how brief may subject the customer to serious penalties.

Approaches in accordance with various embodiments can take advantage of a component such as an API gateway 106, or API filtering proxy, to receive certain API calls, or other requests, sent from the client device 102 or other such sources. The received API call would otherwise have directly called a target API endpoint 122 for processing against a target set of resources 126, 128 in a target resource environment 124, sub-environment, or allocation. The calls can be defined or identified in any of a number of different ways. For example, in one embodiment calls from a client device that are framed using a specific protocol and received by the API gateway 106 are directed to a task manager 108 for processing. An SDK or other offering provided to the client can be configured to resolve the names of the regional API endpoints to the fully-qualified DNS domain names ("FQDNs") of the API Gateway instead, such as in the context of SDKs including, but not limited to, Python and Java SDKs. The API Gateway 106 and/or task manager 108 can verify the client's authentication and authorization against a front-end account identity management policy, for example, and then unpack or otherwise process the API call. The task manager can also log the call details using a monitoring service 110 to a bucket 114 or other appropriate location, which can be configured with write-only sharing, versioning, and deletion protection in some embodiments. In some embodiments these tasks may be performed before the API call is passed to the task manager 108, which as discussed in more detail later herein can assign one or more task-based resources, or workers, to perform specific tasks with respect to the API call.

The task-based resource(s) allocated by the task manager 108 can perform tasks such as a fine-grained filtering of the API. The resources in some embodiments can perform a full parse of API calls unpacked by the API endpoint. In some embodiments, the filtering takes the form of string-matching within a large case/switch statement in a task-based resource. Rather than invoke clean-up actions on a match, the resource can generate an error and not pass the API call to the actual API endpoint 122. The task-based resource is therefore "default allow" in nature, although default deny approaches can be used as well in various embodiments. Only if the call is allowed to execute by the metrics in the task-based resource, where the metrics can potentially be anything programmable in, or callable from, Python, Java or Node.js in some embodiments, will the task-based resources frame a new API call to an actual API endpoint 122 and make a call which will proceed. The client device 102 may be prevented from calling the API gateway 106 directly, such as by an identity management policy.

For compliance purposes, the API call filtering can be extended or configured to enable integration with more sophisticated continuous monitoring tools and services, as may include Cloud Custodian, the Evident.io Security Platform, and Dome9 ARC, among other such options. These tools in conventional deployments would operate in a detect-respond system to make detailed and nuanced decisions on compliance, such as in the context of a rules or reasoning engine configured to meet an industry compliance standard. However, by simulating API call effects before the API call is made and configuring the continuous monitoring system to detect these effects, the response of the continuous monitoring system to the simulated effects can be monitored, in order to determine whether the API call should be allowed to execute before the fact, rather than after.

The client device can use, for example, a command line interface or SDK to connect to the API Gateway 106. The client device can be under the impression, through the SDK or otherwise, that the API Gateway 106 is the actual target API endpoint(s) 122. In some embodiments, this can be performed by changing the endpoint-to-DNS lookup table. The client device 102 can communicate with the API Gateway using, for example, calls in which are embedded standard RESTful API calls, or other appropriate calls or requests. There can be one or more valid users in the front-end account, where the access and secret access keys can be managed. The API gateway 106 can verify the authentication and authorization for the account users making access via the client device 102 against, for example, a front-end account identity management policy, and can unpack the API call. The API gateway can also log the call details via the monitoring service 110 to a bucket in a separate account (not shown) which can be configured with write-only sharing, versioning, deletion, and/or archiving permissions, among other such options. The API call is then passed to the task manager 108 for processing.

The task manager 108 as mentioned can allocate one or more task-based resources to perform specific tasks with respect to the API call, such as for GET and POST actions. The task manager 108 can catch API call GET and POST requests made by the client device 102. The resources may have roles that grant them write permissions on the bucket 114 as well as the ability to synthesize and make API calls to the target API endpoint 122 for the service or services being proxied.

A monitoring service 110, or continuous monitoring tools such as those discussed herein, can monitor various events and changes to the configuration database 112, or a shadow copy of the configuration database, for logs of API calls executed and the changes in environment configuration that result from them. The service 100 in this example, when acting in the shadow copy, can also perform API call modeling as discussed herein. The service can examine the candidate API calls parsed by the task manager 108, and model what the effects would be if executed in the shadow copy. The service can also synthesize log records which would be emitted from the real configuration database, as discussed elsewhere herein, if the change were made there instead, and can put those records in the corresponding bucket 114. As mentioned above, the received API call is never actually executed against the shadow copy, rather it is parsed and analyzed, and its effects as they would be, are modeled there. The records in some embodiments are JSON-formatted records of a known format containing information about API calls made, details and potentially credentials of who made the calls, and a timestamp, although other relevant information can be included as well. The records in various embodiments are not cryptographically signed or otherwise authenticated as originating from specific services, although some records may also have a cryptographic digest of then written elsewhere as an integrity verification mechanism. The relevant task-based resource(s) can then synthesize records of the same format for initial events which would occur in the event that the API call request made, or was to be executed. As mentioned, the API call can first be modeled in a shadow copy that is synchronized or substantially up to date with the configuration database 112. If the task-based resource synthesizes shadow log records as would be created in the event of the API call being filtered being made, and puts the records into the bucket 114 in the control plane as though the records had been created by actual log sources, then the continuous monitoring tools running on the relevant resources 118 they manage in the data plane 116 of the resource environment can ingest and analyze the shadow log records as though the API call being filtered has succeeded. The result of the analysis can then be fed back to the task manager 108 or relevant task-based resource regarding whether a compliance breach would occur, without the API call actually being executed against the resources of the target environment 124. If the continuous monitoring tools raise an alert via a mechanism such as messaging service 120 which can be read by the task-based resource, then the resource will know that the API call being filtered should not be allowed to succeed. The task manager and/or relevant task-based resource can then cause the API call to be rejected, such as by using an http 403 response. The response in some embodiments can include an error string or message from the notification post made by the compliance tool. In this way, the impact is determined before the all is executed against any actual resources in the target environment 124.

In some embodiments the proxying may only be able to be performed for initial events for an API call received to the gateway, where the API call might otherwise result in a flow of execution that also involves further API calls being made on behalf of these services. Some embodiments may construct chains of shadow log records to simulate compound calls, such as where the state machine involved is wholly predictable in nature. Various examples herein will focus on single calls that do not result in such an execution flow for simplicity of explanation.

In addition synthesizing shadow log records for simple API calls, configuration services can be analyzed as well. Monitoring systems 110 can be stateless log-generating services, once the logs are extracted from queues and deposited in the relevant bucket 114. A configuration service, on the other hand, can be stateful. A configuration service can comprises a database of multi-tenant resource asset configuration information, such as a Configuration Management Database (CMDB) in ITIL terms, within an account that can be queried to ascertain the configuration of all assets in the account at a given time, or the configuration history of a given asset since it was created (or since the configuration service was enabled), whichever is more recent. An example configuration service can also present change information in a stream, and these configuration records can be synthesized by the task-specific functions and deposited in the appropriate bucket. However, in order to present a configuration service that can be queried by a continuous monitoring tool, it can be necessary in at least some embodiments to create a shadow database within the configuration service, which can be updated by the task manager 108 and relevant resources, or any other entity with appropriate permissions to create a shadow change event.

The configuration service can be incorporated into a set of shadow data sources that can inform a continuous monitoring service 110 of the effects of a simple API call prior to the API call actually being executed. In some embodiments, a shadow clone of the live CMDB for each customer that is using the configuration service can be maintained, and pre-execution API calls for services that the configuration service supports ingested. The calls can be parsed, and changes made to the shadow CMDB that would result, were they successfully executed in the live environment, in the live CMDB (treating the environment in-scope for the configuration service, and speculative configuration input to it, as a finite state machine). The shadow clone can also be allowed to be re-synced against the live CMDB, to erase the action of the pre-execution API call once an evaluation by the continuous monitoring service 110 has completed. This can include, for example, an additional task-specific resource subscribing to a notification topic or thread from the messaging services 120 in the data plane 116 and executing a re-synchronization call. For consumption by continuous monitoring tools, the shadow log records can be synthesized and a shadow configuration management database used to pre-empt the execution of an API call itself and model its effects. This means that, rather than detecting a change and responding to it if a compliance breach occurs as per a conventional mode of operation, the continuous monitoring tools are able to act to determine whether the effects of an API call would result in a compliance breach before it is actually executed, so that the rest of the environment is able to act to prevent the breach happening by preventing the execution.

Once a task-specific resource has received one or more responses over the subscribed message topic, the resource can (for an OK or similar response) synthesize a new version of the API call that it originated and call the target API endpoint 122 by virtue of actions allowed to it in the corresponding role that permits calls to be made against the service APIs in the role which permit it to make calls against service APIs for the target resource environment 124. The role can be any appropriate type of role that can be assigned to the task manager 108 and used for purposes such as granting access and assigning permissions, among other such options. If the response is one of non-compliance, an http 403 (or other) response can be synthesized or otherwise generated to be provided to the client device 102 via the API gateway 106. As mentioned, the actual API endpoint(s) 122 can be prevented from being called directly by the client device. This can be accomplished through a combination of permissions that require valid API calls to originate from an IP address commensurate with a task-specific resource, as well as permissions requiring valid API calls to be made from roles assigned to identified, task-specific functions. Further, the policies, task-specific resources, and their identifiers can be maintained outside the scope of visibility of the maintainers or users of the front-end accounts.

Figure 2A:
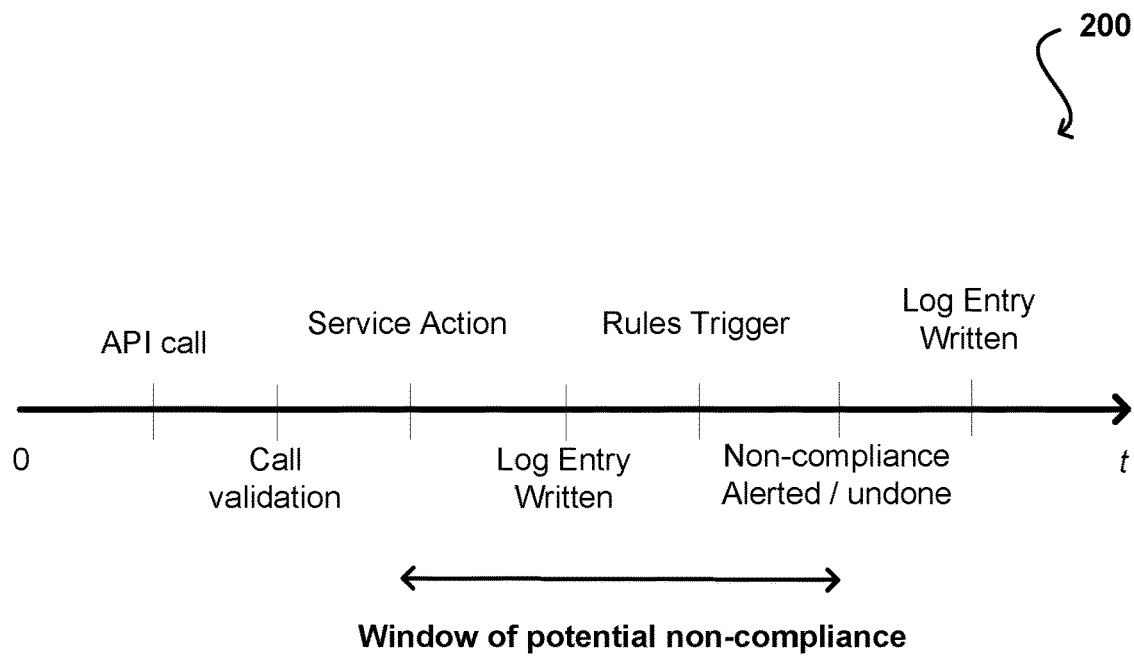
FIGS. 2A and 2B illustrate example timelines with and without testing of a shadow configuration in accordance with various embodiments
Figure 2B:
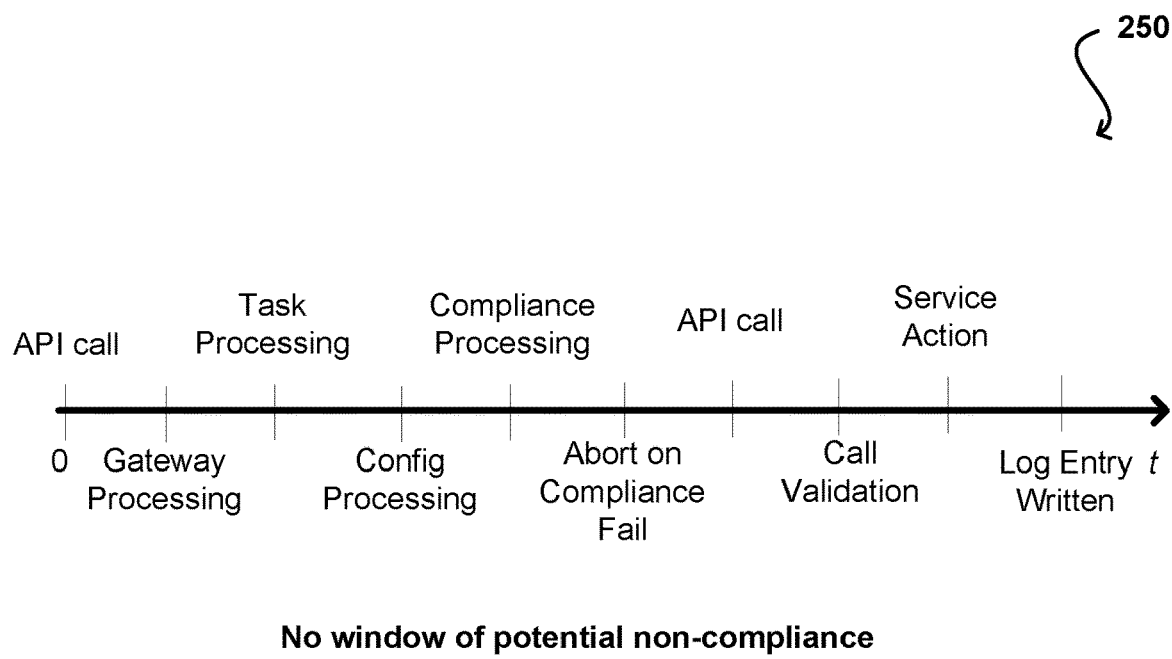

FIGS. 2A and 2B illustrate example timelines that can occur using conventional approaches and approaches in accordance with the various embodiments. It should be understood that there is no scale to the timelines and that the separations between events may not be reflective of the relative separations in a specific implementation. In the example timeline 200 of FIG. 2A, an API call is received from a client device, or other such source, and the call is validated. The service action for the call is then performed, such as to modify the configuration of one or more aspects of the target resource environment. As illustrated in this conventional detect and remediate approach, this execution of the call can start a window of time in which the system may be out of compliance due at least in part to the performed service action. One or more log entries can be written for the change, which can then be detected by a monitoring system in response to a rules trigger or other such action. The non-compliance can be detected from the log entries, and an alert generated or remedial action taken to return to compliance, such as by undoing the action. In some embodiments the remediation can be automatic. It is at this point that the system may return to compliance and the non-compliance window may be closed. Even if the window is relatively small, such as on the order of hundreds of milliseconds, the environment still will be out of compliance and may be subject to penalties or other such actions or results. One or more additional log entries will be written to indicate the undoing of the action and the results thereof. Entities such as an external auditor or regulator will be able to see the evidence in the log data of the out-of-compliance state that the detection and remediation system detected and remediated. The issue here is that "out of compliance" is "out of compliance" no matter how transient the compliance breach was.

The timeline 250 of FIG. 2B instead utilizes an approach in accordance at least one embodiment that eliminates the window of non-compliance. As mentioned, a pre-execution API call assessment and validation environment is provided wherein an API call submitted by an authorized user might nonetheless receive a response such as "403: Forbidden— Were this API call to be executed, the target environment would be in breach of PCI-DSS Requirement 4", and the call prevented from executing for the reason stated, owing to the enhanced call context and sense-checking the invention enables. As part of the API call lifecycle, an API call is received from a client device or other such source, and an API gateway authentication is performed while processing the API, as well as performing an unpacking of the API call. A task-specific resource can be allocated by a task manager, and the resource can process tasks such as to parse the API call and generate a shadow log record for the shadow copy of the configuration database. Those logs can be deposited in the appropriate bucket or other such location. The shadow logs records can then be analyzed by the continuous monitoring systems running on the relevant instances, as part of the configuration and compliance processing. The analysis can determine whether or not the log records indicate the shadow environment would be in compliance with one or more specified compliance requirements. The task-specific resource can provide information about the decision to a messaging service, for example, which can cause the request processing to be aborted if the compliance check failed. As mentioned, this can include sending an error response back to the source of the initial API call. If the compliance check passed, the relevant task-specific resource can be notified and a new API call generated and transmitted to the appropriate target API endpoint. The new API call can be validated and the service action taken on the target resources. The appropriate log entries can also be generated. The response from the services in the resource environment can be returned by the API endpoint to the task-specific resource, re-framed by the resource to rewrite the account identifier, and sent back to the client device via the API Gateway. In some embodiments the process may need to complete within a maximum amount of time for which the task-specific resources are allocated for the task. Other notification approaches can be used as well within the scope of the various embodiments. As illustrated, there is no potential window of non-compliance in such an embodiment because the API call is evaluated before it is ever executed in the target resource environment. After testing is complete, the shadow copy can be deleted or re-synchronized with the actual configuration management database (undoing the testing changes) for testing of subsequent API calls or other such requests.

As mentioned, the task-specific resource can be programmed to generate log entries that are similar to those that would be generated by the monitoring, or a dedicated compliance or other such system or service. In some embodiments a separate task-based resource can be charged with creating a shadow copy of the configuration database for purposes of evaluating the API call. The resources can be configured to write the "fake" log entries to a specified bucket or other location accessible to the continuous monitoring systems. In some embodiments there may be two sets of monitoring tools, wherein one processes the actual log entries and one processes only the shadow log entries, to maintain a full separation. The shadow log entries as mentioned are generated based on the records that would be generated were the API call to succeed. The event logs can take any appropriate form, such as JSON documents in some embodiments.

There can be various types of compliance that may be enforced for such an environment, as may depend upon the industry, type of data stored, or type of actions performed in the target environment. This can include fraud avoidance, security measures, and the like. As another example, an organization might hold itself out as being ISO compliant, which may involve ensuring that various international standards are met. Various other types of regulatory compliance can be ensured as well, as may relate to ASME, PCI-DSS, GLBA, FISMA, or HIPAA compliance, among other such options.

Figure 3:
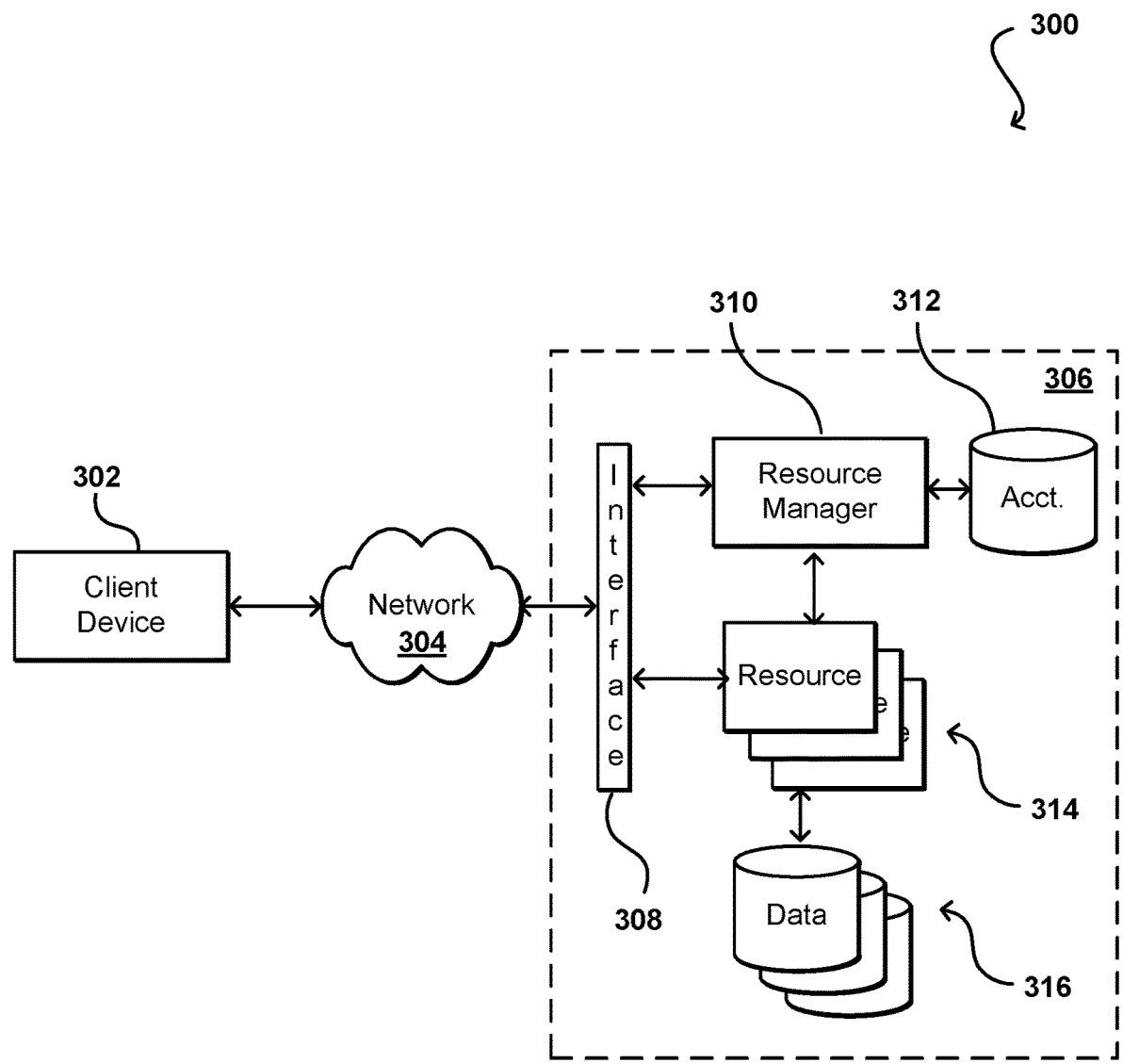
FIG. 3 illustrates an example environment in which various embodiments can be implemented.

FIG. 3 illustrates an example resource environment 300 in which aspects of the various embodiments can be implemented. In this example a user is able to utilize a client device 302 to submit requests across at least one network 304 to a multi-tenant resource provider environment 306 as discussed with respect to FIG. 1. In various embodiments, the provider environment may include various types of resources that can be utilized by multiple users for a variety of different purposes. In this example the provider environment includes a plurality of resources 314 of one or more types. These types can include, for example, application servers operable to process instructions provided by a user or database servers operable to process data stored in one or more data stores 316 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 314 can submit a request that is received to an interface layer 308 of the provider environment 306. The interface layer can include application programming interfaces (APIs) or other exposed interfaces enabling a user to submit requests to the provider environment. The interface layer 308 in this example can also include other components as well, such as at least one Web server, routing components, load balancers, and the like. When a request to provision a resource is received to the interface layer 308, information for the request can be directed to a resource manager 310 or other such system, service, or component configured to manage user accounts and information, resource provisioning and usage, and other such aspects. A resource manager 310 receiving the request can perform tasks such as to authenticate an identity of the user submitting the request, as well as to determine whether that user has an existing account with the resource provider, where the account data may be stored in at least one data store 312 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 302 to communicate with an allocated resource without having to communicate with the resource manager 310, at least until such time as a relevant aspect of the user account changes, the user is no longer granted access to the resource, or another such aspect changes.

The resource manager 310 (or another such system or service) in this example can also function as a virtual layer of hardware and software components that handles control functions in addition to management actions, as may include provisioning, scaling, replication, etc. The resource manager can utilize dedicated APIs in the interface layer 308, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 308 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

As mentioned, such an environment enables organizations to obtain and configure computing resources over a network such as the Internet to perform various types of computing operations (e.g., execute code, including threads, programs, software, routines, subroutines, processes, etc.). Thus, developers can quickly purchase or otherwise acquire a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers.

In many such environments, resource instances such as virtual machines are allocated to a customer (or other authorized user) for a period of time in order to process tasks on behalf of that customer. In many cases, however, a customer may not have a steady flow of work such that the customer must maintain a sufficient number of virtual machines to handle peak periods of work but will often have less than this amount of work. This can result in underutilization and unneeded expense for both the customer and the resource provider. Approaches in accordance with various embodiments can instead allocate resource instances on a task or event basis to execute a function. A resource instance can be allocated to run a function in response to a customer request or event, and once the function has completed that instance can either be made available for processing a different event or destroyed, among other such options. In either case, the customer will not be charged for more processing by the instance than was needed to run the function.

Figure 4:
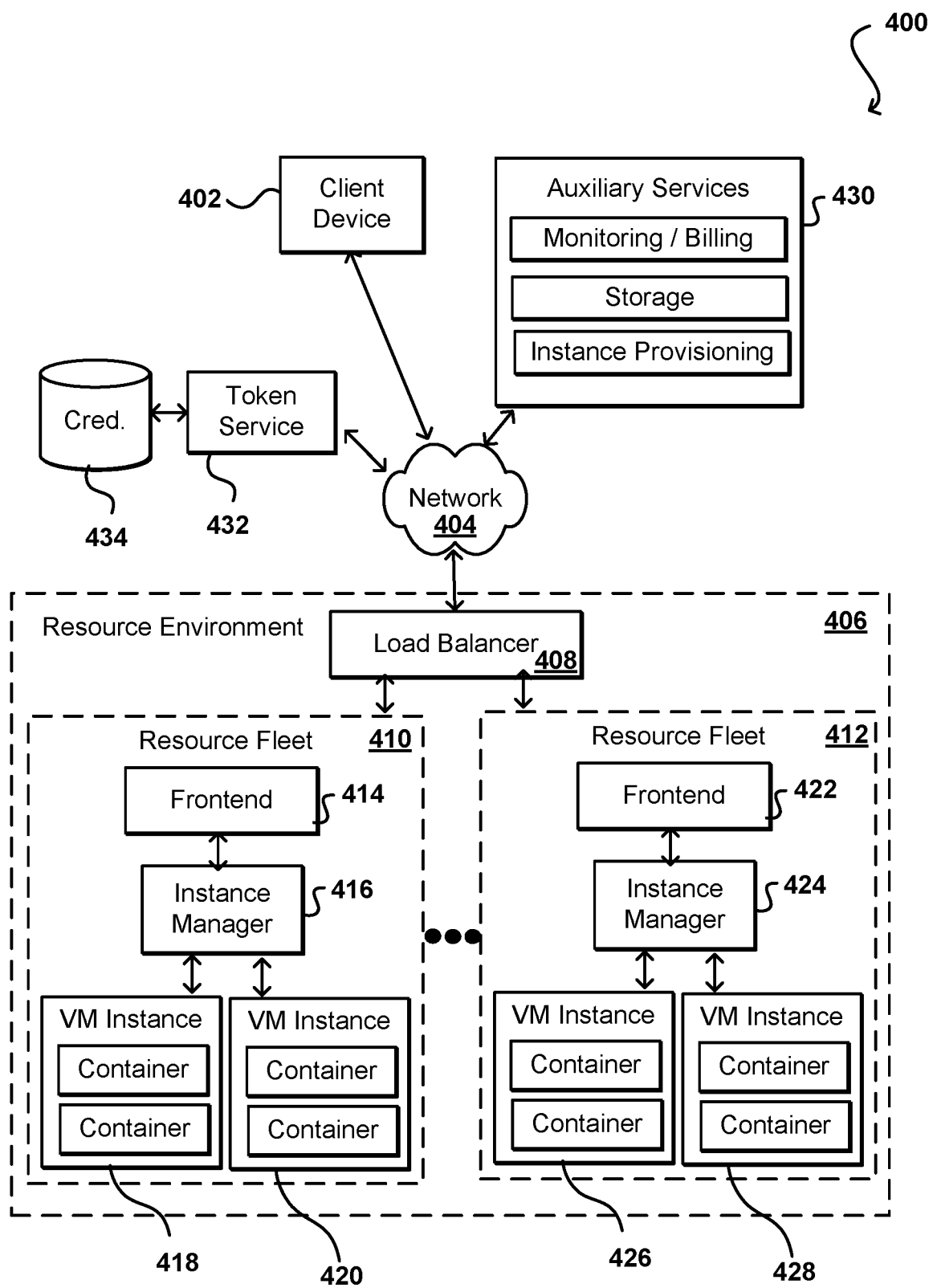
FIG. 4 illustrates an example resource environment for providing task-based resource allocation that can be used in accordance with various embodiments.

FIG. 4 illustrates components of an example environment 400 that can be used to implement such functionality. The functionality can be offered as a service, such as a Web service, in at least some embodiments, wherein a client device 402 associated with a customer can submit requests or event information over at least one network 404 to the resource environment (i.e., a resource provider environment, service provider environment, or other shared resource or multi-tenant environment). The events or requests can each be associated with specific code to be executed in the resource environment. This code can be registered with the system, and will be referred to herein as a registered function, which can be owned by a respective customer or available for use by multiple customers, among other such options. The compute service offered by the resource environment can be referred to as a "serverless" compute service that can allocate virtual resources to execute registered functions in response to customer events and automatically manage the underlying compute resources. The functions can be executed on high-availability compute infrastructure that can perform the administration of the compute resources, including server and operating system maintenance, capacity provisioning and automatic scaling, code and security patch deployment, and code monitoring and logging. Customers supply the code to be executed and can be billed based on the actual amount of compute time utilized on behalf of those customers.

In some embodiments, a registered function can include the customer code as well as associated configuration information. The configuration information can include, for example, the function name and resource requirements. Registered functions can be considered to be "stateless," in that they do not rely on state contained in the infrastructure and considered to be lacking affinity to the underlying infrastructure (e.g., the functions are not installed or otherwise tied to the operating system running in the virtual machine), so that the resource managers can rapidly launch as many copies of the function as is needed to scale to the rate of incoming events. A customer providing the code for a function can specify various configuration parameters, such as the memory, timeout period, and access rules, among other such aspects. The customer in some embodiments can also specify resources that are able to trigger execution of a registered function by a resource instance. These resources can include, for example, data buckets, database tables, or data streams, among other such options. The resource manager can invoke the code only when needed and automatically scale to support the rate of incoming requests without requiring configuration or management on behalf of the customer. A function can be executed by an allocated resource instance within milliseconds of an event in at least some embodiments, and since the service scales automatically the performance will remain consistently high as the frequency of events increases. Further, since the code is stateless the service can initialize as many resource instances as needed without lengthy deployment and configuration delays.

Routing information for customer requests or events to execute on a virtual compute fleet (e.g., a group of virtual machine instances that may be used to service such requests) based on the frequency of execution of the user code enables high frequency user code to achieve high distribution, which can be good for fault tolerance, and enables low frequency user code to achieve high consolidation, which can be good for cost reduction.

An environment such as that described with respect to FIG. 4 can facilitate the handling of requests to execute user code on a virtual compute fleet by utilizing the containers created on the virtual machine instances as compute capacity. Information for a request or event can be received to a load balancer 408 that can determine an appropriate resource fleet 410, 412 to which to direct the information. As will be discussed in more detail later herein, the decision can be based upon various types of information, as may include the context associated with the type of event or request. Upon receiving a request to execute user code on a selected virtual compute fleet 410, 412, a frontend service 414, 422 associated with the virtual compute fleet can provide the information to an instance manager, which can direct the information to a virtual machine (VM) instance 418, 420, 426, 428 where a container on the instance can provide an execution environment for the registered function.

The client device 402 may utilize one or more user interfaces, command-line interfaces (CLIs), application programing interfaces (APIs), and/or other programmatic interfaces for generating and uploading customer code, invoking the customer code (e.g., submitting a request to execute the code on the virtual compute system), scheduling event-based jobs or timed jobs, tracking the customer code, and/or viewing other logging or monitoring information related to their requests and/or customer code. Although one or more embodiments may be described herein as using a user interface, it should be appreciated that such embodiments may, additionally or alternatively, use any CLIs, APIs, or other programmatic interfaces.

In the example of FIG. 4, the resource environment 406 is illustrated as being connected to at least one network 404. In some embodiments, any of the components within the recourse environment can communicate with other components (e.g., client computing devices 402 and auxiliary services 430, which may include monitoring/logging/billing services, storage service, an instance provisioning service, and/or other services that may communicate with components or services of the resource environment 406. In other embodiments, only certain components such as the load balancer 408 and/or the frontends 414, 422 may be connected to the network 404, and other components of the virtual resource service (i.e., components of the resource fleets) may communicate with other components of the resource environment 406 via the load balancer 408 and/or the frontends 414, 422.

Customer may use the resource fleets 410, 412 to execute user code thereon. For example, a customer may wish to run a piece of code in connection with a web or mobile application that the customer has developed. One way of running the code would be to acquire virtual machine instances from service providers who provide infrastructure as a service, configure the virtual machine instances to suit the customer's needs, and use the configured virtual machine instances to run the code. Alternatively, the customer may send the resource service a code execution request. The resource service can handle the acquisition and configuration of compute capacity (e.g., containers, instances, etc., which are described in greater detail below) based on the code execution request, and execute the code using the compute capacity. The allocation may automatically scale up and down based on the volume, thereby relieving the customer from the burden of having to worry about over-utilization (e.g., acquiring too little computing resources and suffering performance issues) or under-utilization (e.g., acquiring more computing resources than necessary to run the codes, and thus overpaying).

In the configuration depicted in FIG. 4, a first resource fleet 410 includes a frontend 414, an instance manager 416 (later referred to herein as a worker manager), and virtual machine instances 418, 420. Similarly, other resource fleets 412 can also include a frontend 422, an instance manager 424, and virtual machine instances 426, 428, and there can be any appropriate number of resource fleets and any appropriate number of instances in each resource fleet. The environment can include low and high frequency fleets as well in at least some embodiments, as may serve different types of requests or requests for different types of customers. The fleets can also include any number of worker managers, and in some embodiments the frontend and the worker manager can be resident on a single virtual machine instance.

In some embodiments, the load balancer 408 serves as a front door to all the other services provided by the virtual compute system. The load balancer 408 processes requests to execute user code on the virtual compute system and handles the first level of load balancing across the frontends 414, 422. For example, the load balancer 408 may distribute the requests among the frontends 414, 422 (e.g., based on the individual capacity of the frontends). The requests can be distributed evenly across the frontends or distributed based on the available capacity on the respective fleets, among other such options.

Customer code as used herein may refer to any program code (e.g., a program, routine, subroutine, thread, etc.) written in a program language. Such customer code may be executed to achieve a specific task, for example, in connection with a particular web application or mobile application developed by the user. For example, the customer code may be written in JavaScript (node.js), Java, Python, and/or Ruby. The request may include the customer code (or the location thereof) and one or more arguments to be used for executing the customer code. For example, the customer may provide the customer code along with the request to execute the customer code. In another example, the request may identify a previously uploaded program code (e.g., using the API for uploading the code) by its name or its unique ID. In yet another example, the code may be included in the request as well as uploaded in a separate location (e.g., the external storage service or a storage system internal to the resource environment 406) prior to the request is received by the load balancer 408. The virtual compute system may vary its code execution strategy based on where the code is available at the time the request is processed.

In some embodiments, the frontend 414 for a fleet can determine that the requests are properly authorized. For example, the frontend 414 may determine whether the user associated with the request is authorized to access the customer code specified in the request. The frontend 414 may receive the request to execute such customer code in response to Hypertext Transfer Protocol Secure (HTTPS) requests from a customer, or user associated with that customer. Also, any information (e.g., headers and parameters) included in the HTTPS request may also be processed and utilized when executing the customer code. As discussed above, any other protocols, including, for example, HTTP, MQTT, and CoAP, may be used to transfer the message containing the code execution request to the frontend 414. The frontend 414 may also receive the request to execute such customer code when an event is detected, such as an event that the customer has registered to trigger automatic request generation. For example, the customer may have registered the customer code with an auxiliary service 430 and specified that whenever a particular event occurs (e.g., a new file is uploaded), the request to execute the customer code is sent to the frontend 414. Alternatively, the customer may have registered a timed job (e.g., execute the user code every 24 hours). In such an example, when the scheduled time arrives for the timed job, the request to execute the customer code may be sent to the frontend 414. In yet another example, the frontend 414 may have a queue of incoming code execution requests, and when the batch job for a customer is removed from the virtual compute system's work queue, the frontend 414 may process the customer request. In yet another example, the request may originate from another component within the resource environment 406 or other servers or services not illustrated in FIG. 4.

A customer request may specify one or more third-party libraries (including native libraries) to be used along with the customer code. In one embodiment, the customer request is a ZIP file containing the customer code and any libraries (and/or identifications of storage locations thereof) that are to be used in connection with executing the customer code. In some embodiments, the customer request includes metadata that indicates the program code to be executed, the language in which the program code is written, the customer associated with the request, and/or the computing resources (e.g., memory, etc.) to be reserved for executing the program code. For example, the program code may be provided with the request, previously uploaded by the customer, provided by the virtual compute system (e.g., standard routines), and/or provided by third parties. In some embodiments, such resource-level constraints (e.g., how much memory is to be allocated for executing a particular user code) are specified for the particular customer code, and may not vary over each execution of the customer code. In such cases, the virtual compute system may have access to such resource-level constraints before each individual request is received, and the individual requests may not specify such resource-level constraints. In some embodiments, the customer request may specify other constraints such as permission data that indicates what kind of permissions that the request has to execute the user code. Such permission data may be used by the virtual compute system to access private resources (e.g., on a private network).

In some embodiments, the customer request may specify the behavior that should be adopted for handling the customer request. In such embodiments, the customer request may include an indicator for enabling one or more execution modes in which the customer code associated with the customer request is to be executed. For example, the request may include a flag or a header for indicating whether the customer code should be executed in a debug mode in which the debugging and/or logging output that may be generated in connection with the execution of the customer code is provided back to the customer (e.g., via a console user interface). In such an example, the virtual compute system 110 may inspect the request and look for the flag or the header, and if it is present, the virtual compute system may modify the behavior (e.g., logging facilities) of the container in which the customer code is executed, and cause the output data to be provided back to the customer. In some embodiments, the behavior/mode indicators are added to the request by the user interface provided to the customer by the virtual compute system. Other features such as source code profiling, remote debugging, etc. may also be enabled or disabled based on the indication provided in the request.

The frontend 414 can receive requests to execute customer code on the virtual compute system that have been processed by the load balancer 408. The frontend 414 can request the instance manager 416 associated with the frontend 414 of the particular fleet 410 to find compute capacity in one of the virtual machine instances 418, 420 managed by the instance manager 416. The frontend 414 may include a usage data manager for determining the usage status (e.g., indicating how frequently the user code is executed) of a particular customer code, and a customer code execution manager for facilitating the execution of customer code on one of the virtual machine instances managed by the worker manager. The instance manager 416 manages the virtual machine instances in the respective fleet. After a request has been successfully processed by the load balancer 408 and the frontend 414, the instance manager 416 finds capacity to service the request to execute customer code on the virtual compute system. For example, if there exists a container on a particular virtual machine instance that has the user code loaded thereon, the instance manager 416 may assign the container to the request and cause the request to be executed in the container. Alternatively, if the customer code is available in the local cache of one of the virtual machine instances, the instance manager 416 may create a new container on such an instance, assign the container to the request, and cause the customer code to be loaded and executed in the container. Otherwise, the instance manager 416 may assign a new virtual machine instance to the customer associated with the request from the pool of pre-initialized and pre-configured virtual machine instances, download the customer code onto a container created on the virtual machine instance, and cause the customer code to be executed in the container.

In some embodiments, the virtual compute system is adapted to begin execution of the customer code shortly after it is received (e.g., by the load balancer 408 or frontend 414). A time period can be determined as the difference in time between initiating execution of the customer code (e.g., in a container on a virtual machine instance associated with the customer) and receiving a request to execute the customer code (e.g., received by a frontend). The virtual compute system can be adapted to begin execution of the customer code within a time period that is less than a predetermined duration. The customer code may be downloaded from an auxiliary service 430. The data may comprise user code uploaded by one or more customers, metadata associated with such customer code, or any other data utilized by the virtual compute system to perform one or more techniques described herein. Although only the storage service is illustrated in the example of FIG. 4, the resource environment 406 may include other levels of storage systems from which the customer code may be downloaded. For example, each instance may have one or more storage systems either physically (e.g., a local storage resident on the physical computing system on which the instance is running) or logically (e.g., a network-attached storage system in network communication with the instance and provided within or outside of the virtual compute system) associated with the instance on which the container is created. Alternatively, the code may be downloaded from a web-based data store provided by the storage service.

In some embodiments, once a virtual machine instance has been assigned to a particular customer, the same virtual machine instance cannot be used to service requests of any other customer. This provides security benefits to customers by preventing possible co-mingling of user resources. Alternatively, in some embodiments, multiple containers belonging to different customers (or assigned to requests associated with different customers) may co-exist on a single virtual machine instance. Such an approach may improve utilization of the available compute capacity. Although the virtual machine instances are described here as being assigned to a particular customer, in some embodiments the instances may be assigned to a group of customers, such that an instance is tied to the group of customers and any member of the group can utilize resources on the instance. For example, the customers in the same group may belong to the same security group (e.g., based on their security credentials) such that executing one member's code in a container on a particular instance after another member's code has been executed in another container on the same instance does not pose security risks. Similarly, the instance manager 416 may assign the instances and the containers according to one or more policies that dictate which requests can be executed in which containers and which instances can be assigned to which customers. An example policy may specify that instances are assigned to collections of customers who share the same account (e.g., account for accessing the services provided by the virtual compute system). In some embodiments, the requests associated with the same customer group may share the same containers (e.g., if the customer code associated therewith are identical). In some embodiments, a request does not differentiate between the different customers of the group and simply indicates the group to which the customers associated with the requests belong. In some embodiments, the virtual compute system may maintain a separate cache in which customer code is stored to serve as an intermediate level of caching system between the local cache of the virtual machine instances and a web-based network storage (e.g., accessible via the network 404).

The instance manager 416 may also manage creation, preparation, and configuration of containers within virtual machine instances. Containers can be logical units within a virtual machine instance and utilize resources of the virtual machine instances to execute customer code. Based on configuration information associated with a request to execute customer code, such a container manager can create containers inside a virtual machine instance. In one embodiment, such containers are implemented as Linux containers.

After the customer code has been executed, the instance manager 416 may tear down the container used to execute the user code to free up the resources it occupied to be used for other containers in the instance. Alternatively, the instance manager 416 may keep the container running to use it to service additional requests from the same customer. For example, if another request associated with the same customer code that has already been loaded in the container, the request can be assigned to the same container, thereby eliminating the delay associated with creating a new container and loading the customer code in the container. In some embodiments, the instance manager 416 may tear down the instance in which the container used to execute the customer code was created. Alternatively, the instance manager 416 may keep the instance running to use the instance to service additional requests from the same customer. The determination of whether to keep the container and/or the instance running after the user code is done executing may be based on a threshold time, the type of the user, average request volume of the user, and/or other operating conditions.

In some embodiments, the virtual compute system may provide data to one or more of the auxiliary services 430 as the system services incoming code execution requests. For example, the virtual compute system may communicate with the monitoring/logging/billing services, which may include: a monitoring service for managing monitoring information received from the virtual compute system, such as statuses of containers and instances on the virtual compute system; a logging service for managing logging information received from the virtual compute system, such as activities performed by containers and instances on the virtual compute system; and a billing service for generating billing information associated with executing customer code on the virtual compute system (e.g., based on the monitoring information and/or the logging information managed by the monitoring service and the logging service). In addition to the system-level activities that may be performed by the monitoring/ logging/billing services (e.g., on behalf of the virtual compute system) as described above, the monitoring/logging/billing services may provide application-level services on behalf of the customer code executed on the virtual compute system. For example, the monitoring/logging/billing services may monitor and/or log various inputs, outputs, or other data and parameters on behalf of the customer code being executed on the virtual compute system. Although shown as a single block, the monitoring, logging, and billing services may be provided as separate services.

In some embodiments, the instance manager 416 may perform health checks on the instances and containers managed by the instance manager (e.g., an "active pool" of virtual machine instances managed by the instance manager and currently assigned to one or more customers). For example, the health checks performed by the instance manager 416 may include determining whether the instances and the containers managed by the instance manager have any issues of (1) misconfigured networking and/or startup configuration, (2) exhausted memory, (3) corrupted file system, (4) incompatible kernel, and/or any other problems that may impair the performance of the instances and the containers. In one embodiment, the instance manager 416 performs the health checks periodically. In some embodiments, the frequency of the health checks may be adjusted automatically based on the result of the health checks. In other embodiments, the frequency of the health checks may be adjusted based on customer requests. In some embodiments, the instance manager 416 may perform similar health checks on the instances and/or containers in the pool of pre-warmed virtual machine instances that are not yet assigned to any customer but ready to service incoming requests. The instances and/or the containers in such a warming pool may be managed either together with those instances and containers in the active pool or separately. In some embodiments, in the case where the health of the instances and/or the containers in the warming pool is managed separately from the active pool, a separate warming pool manager that manages the warming pool may perform the health checks described above on the instances and/or the containers in the warming pool.

The virtual machine instances can be logical in nature and implemented by a single or multiple physical computing devices. At least some of the virtual machine instances may be provisioned to provide a variety of different desired conditions depending on the needs of the user. Examples of the types of desired conditions include, but are not limited to: particular operating systems, particular language runtimes, and particular libraries that may be utilized by the user code. Additionally, one or more virtual machine instances may be provisioned generically when a desired operating condition is not specified or is otherwise not available. One skilled in the relevant art will appreciate that the virtual compute system is logical in nature and can encompass physical computing devices from various geographic regions.

The frontend 414, 422 can route code-processing requests according to a method that is different than the method used by the load balancer 408 to route requests among the frontends. For example, a frontend 414 can route the requests to the specific instance manager based on the customer code and/or based on the customer associated with the customer code. In some embodiments, the routing is determined based on a consistent-hashing scheme in which one or more parameters associated with the request (e.g., customer ID, customer code ID, etc.) are hashed according to a hash function and the request is sent to one of the instance managers that has previously been assigned to the sections of a hash ring (e.g., containing a plurality of hash values) that corresponds to the resulting hash value. For example, the instance managers can occupy one or more sections of the hash ring, and the requests can be mapped to those same hash values. In some embodiments, the hash values may be integer values, and each instance manager may be associated with one or more integer values. The one or more integer values associated with a particular instance manager may be determined based on one or more parameters associated with the instance manager (e.g., IP address, instance ID, etc.). In some embodiments, the request may be sent to the instance manager whose associated integer values are closest to, but not larger than, the hash value calculated for that request (e.g., using modulo arithmetic).

When the frontends determine that one or more instance managers have become unavailable, the frontends can associate the hash values previously associated with the one or more instance managers that have become unavailable with one or more available instance managers in another fleet. Similarly, when a new instance manager is added to a fleet, the new instance manager may take a share of the hash values associated with the existing instance managers. For example, the new instance manager may be assigned one or more sections of the hash ring that were previously assigned to the existing instance managers.

As mentioned, resource capacity can be allocated as needed to execute code or perform specific tasks, which can be allocated in response to various events. The events can include any appropriate types of events, as may be permitted by a service provider or allowed through various rules or policies, among other such options. These can include, for example, modifications to data buckets or updates to data tables, among other such options. The dynamic allocation of such capacity enables service owners to get out of the business of provisioning and managing the underlying hardware for executing code. For flexibility and efficiency in resource management, such a platform or service might not make any guarantees with respect to reusing the same containers or resource instances for running a specific instance of code, such as a registered function, for all incoming requests.

As mentioned, in order to process various types of events a resource instance for a registered function may require access to various other resources, data sources, or other relevant systems or functionality in (or outside) a resource allocation environment. In some embodiments, a function can be configured with a specified role or identity, which will have various associated permissions and privileges. A registered function can be associated with a determined role, and when a resource instance is allocated for the registered function, the resource instance can be provided with an access token, or other appropriate security credential, which can provide the access needed for that function. As illustrated in the example 400 of FIG. 4, the token can be provided by a token service 432, which can be internal or external to the resource environment 406, and may managed by the resource provider or a third party in various embodiments. The token service can store information about various types of roles and access in a credential repository 434, or other appropriate location, and in response to a request for an access token for a registered function, can determine the appropriate role and permissions and provide a corresponding access token to be provided to the allocated resource instance. The frontend 414 or instance manager 416 for a relevant resource fleet 410 can cause the configured role to be bound to the relevant host(s) when an instance of a registered function is created on that host. The role can be bound as an instance profile or other such mechanism. Once the role is bound, the resource instance can assume the bound identity for accessing various resources or dependencies, as may include various data sources, internal or external resource, or network functionality, among other such options. The resource instance can thus obtain the temporary credentials needed to execute the registered function and process the event.

Using such an identity management model, the function instances triggered by any event could thus have access to credentials with the same privileges. For example, a registered function can have input access to a specified data bucket specified in the triggering event and write access to a corresponding database table. The assigned identity role for this function could then allow any function instance to read from any available bucket from that data source and write into any available table in the relevant database. A vulnerability present in the registered lambda function (i.e., an extensible markup language (XML) external entity resolution) could allow a producer of an event to hijack the credentials for the registered function, such as by using an XML external entity attack and retrieving the credentials from a local metadata endpoint for the data source. The security breach might then spread across the buckets of all function owners as well as all available tables in the database.

Accordingly, approaches in accordance with various embodiments attempt to enhance security and limit the impact of any vulnerabilities by creating and delivering temporary credentials for each event, or type of event, that can act as a trigger for a registered function. While the registered function might be associated with a role having a broader set of permissions, the temporary credentials derived therefrom can have privileges restricted to those required to process the triggering event. A function owner can define one or more parameterized access policies for his or her registered function(s) that can be based at least in part upon the types of triggering events for that registered function. The resource allocation service can use these parameterized access policies to generate policy instances corresponding to each event, and use the policy instances for creating and delivering the temporary credentials with each event.

Figure 5:
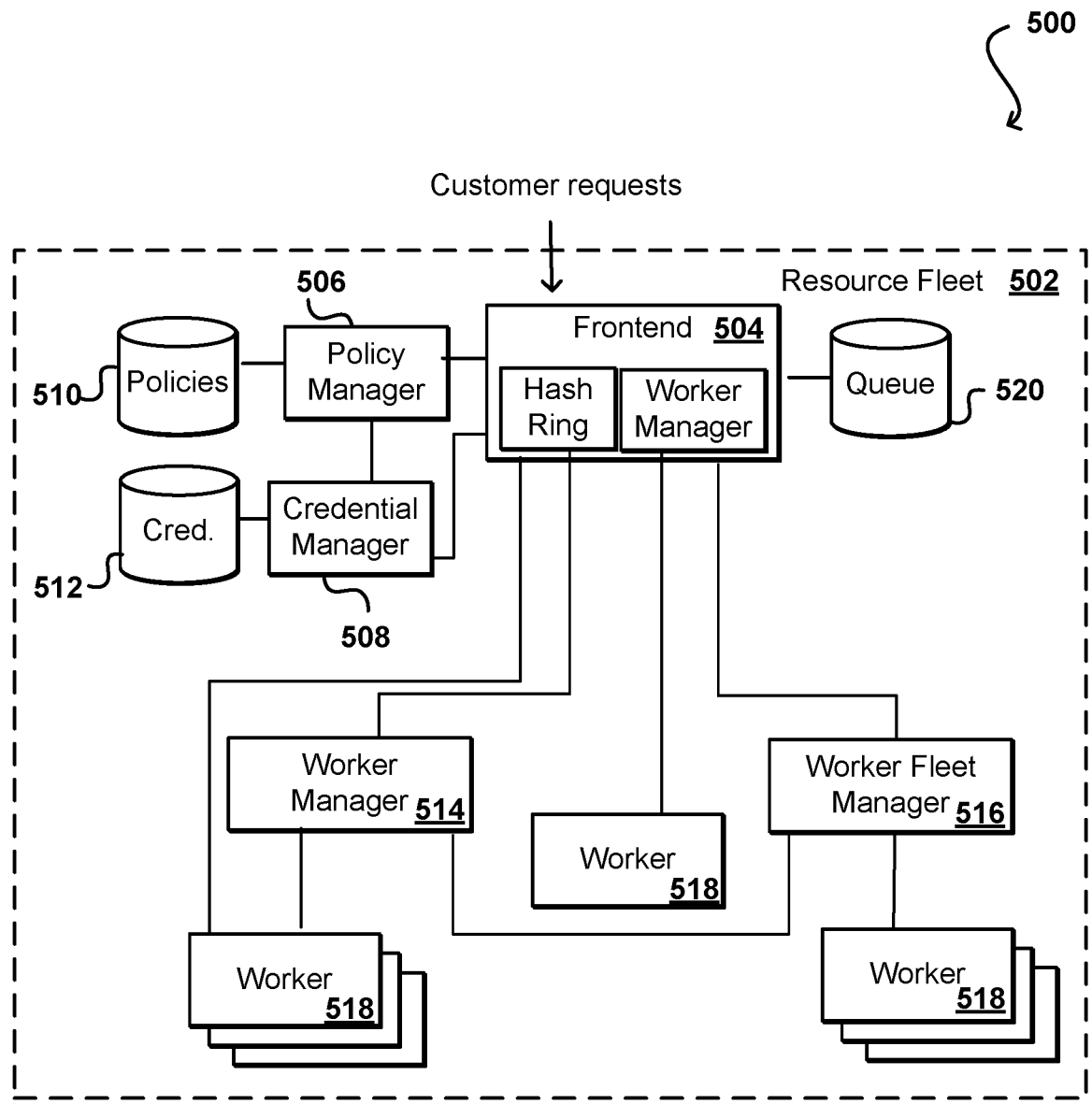
FIG. 5 illustrates an example resource fleet that can be utilized in accordance with various embodiments.

FIG. 5 illustrates an example environment 500 that can be used to implement at least some of this functionality. In this example, information for customer requests or events can be directed to a resource fleet 502. The information can be directed using a load balancer and/or interface layer as discussed previously as part of a resource allocation environment. In this example the resource instances will be referred to as "workers," which in various embodiments can refer to the virtual machine instances 418, 420, 426, 428 described with respect to FIG. 4. It should be understood, however, that various other types of resource instances can be utilized as workers as well within the scope of the various embodiments.

As described, the frontend 504 may receive an event notification, customer request, or other event information that indicates an event has occurred for which a registered function should be utilized or processing. In this example, the frontend 504 can determine the appropriate registered function and place the event information in an event queue 520. In other embodiments the event information might be placed into the event queue before determining the registered function, or the event information might specify the registered function, among other such options. Further, in this event the frontend 504 and/or a worker manager of the frontend can place the event information in the event queue 520, while in other embodiments other worker managers 514, 516 might receive the information and place the information in the same, or a different queue, among other such options. The frontend, worker manager, or a separate queue manager can determine that a worker 518 is now available to process the event information using the respective registered function. This can include, for example, determining that a new instance should be initialized to process the event as well as allocating an existing instance, etc. The respective worker manager 514 can then allocate the relevant worker 518 for the event, pull the event information from the event queue 520, and provide the information to the allocated worker 518 for processing using the registered function.

At some subsequent point, the allocated worker 514 will complete processing for the event. This can occur for a number of different reasons as discussed elsewhere herein. The allocated instance can return a result of the processing that can be received back to the worker manager 514 and/or the frontend 504. In some embodiments the result will go to the worker manager, so the manager knows the instance is available for processing another event, and then can go to the frontend, so the frontend can provide any appropriate response or take another appropriate action.

In order to process the event, a worker 518 will have to be allocated for the relevant registered function. As mentioned, the worker will need to obtain the appropriate access credential(s) for the registered function, as may be determined by a role bound to that instance for the registered function. As mentioned, the role can provide various types of access for a determined period of time, such as fifteen minutes in some embodiments, although other lengths of time can be specified as well. Since there can be various types of triggering events for a function, the role can enable access to all relevant data for any of those events for the entire lifecycle of the function. As mentioned, however, granting all the access provided under the role can enable any vulnerability in the registered function to access data outside the scope of the registered function, and potentially exfiltrate the credentials outside of the function for various other purposes. As an example, various parsers might be used to ingest and process different types of documents, and without a security review of those parsers there is potential that parsing of an untrusted document could expose access to the function credentials.

Accordingly, approaches in accordance with various embodiments can provide event-specific credentials that are derived from an identity role bound, or otherwise associated, to the registered function for a resource instance. The necessary privileges can be provided under the role, but the restricted credentials can prevent access outside that needed to process the event. A system, component, or service such as a credential manager 508 can create a temporary token that has access only to those input and output sources required for processing the event, and can cause that token to be passed to the relevant worker 518 allocated for the event. The event-specific credential can be bound to the resource instance allocated in response to a specific event, and the permissions granted under the temporary credential determined based upon the specific event. The credential manager 508 can generate a temporary token that is event-specific, and can cause that temporary token to also be stored to a credential repository 512 or other appropriate cache such that the credentials can be passed to any other resource instance allocated for a registered function in response to the same type of event.

The event-specific credential can be generated according to the security token bound to the registered function and received from the token service in at least some embodiments. In order to determine which subset of permissions to be granted from the token, a function owner can define one or more relevant access policies that can be stored to a relevant policy data store 510 or other accessible location. A policy manager 506, or other such system or service, can work with the credential manager 508 to determine the appropriate policy for an event, which the credential manager 508 can then use to determine the appropriate permissions and generate the temporary credential to be provided to the allocated worker 518. The policy manager in some embodiments can maintain a mapping between the policies and events, in order to derive the appropriate temporary credentials from the function role. It should be understood that in at least some embodiments the policy manager 506 and/or credential manager 508 could be implemented in the frontend 504, an event router, or another such component discussed or suggested herein.

In at least some embodiments a function owner can provide a template policy which includes variables whose values will be specific to an event. This can include, for example, identifiers for the input and output data sources to which access can be granted, as well as the type of access and other such information. For each event, the available access for the relevant role can be determined, and the variable values for the event inserted into the template policy. The policy manager can then ensure that the permissions per the policy are contained within the overall permissions of the role, and if so can generate the temporary credential to be provided to the allocated worker. In some embodiments the credential manager can generate the event-specific credentials, while in other embodiments the credential manager can submit a request to the token service to receive an event-specific token, among other such options. As mentioned, the credential manager 508 can cache a received event-specific token in a local credential cache 512 to be used for other similar events for the registered function over the lifetime of the temporary credential.

In some embodiments the frontend 504 or worker manager 514 will perform a lookup to determine the relevant role for a function before performing the worker allocation. The frontend or worker manager can also, directly or via a policy manager 506, determine the appropriate template policy mapped to the specific event. The frontend or worker manager can then, directly or via the credential manager, begin filling in the template using the event-specific values. As an example, a registered function might be triggered by a notification event on a storage service, and the event can be received from any bucket on that storage service. The respective values can be filled into the policy template with the specific buckets, tables, or other sources specified in the policy. The policy can then be instantiated into a specific string, such that the policy does not have any value to other parties. The variables in the template policy are thus filled with the respective values from the triggering event. The event-specific policy can then be processed with the base credential received for the role to obtain a second token that has restricted privileges, from the base credentials, specific to the triggering event. The event and the temporary event-specific token can then be passed along to the allocated worker. If any of the credentials are leaked or otherwise obtained by an unintended third party, the credentials would only provide access to the specific input and output sources for the event. The event-specific credentials can also have a shorter period of time in some embodiments, such as on the order of a couple of minutes at most, which can be much shorter than the lifetime of the base credentials for the role. This can include, for example, periods that start right away but end before the valid lifetime of the base credential ends, or can include a specified period of time in the future corresponding to a predicted execution time of the registered function for the event, among other such options.

Figure 6:
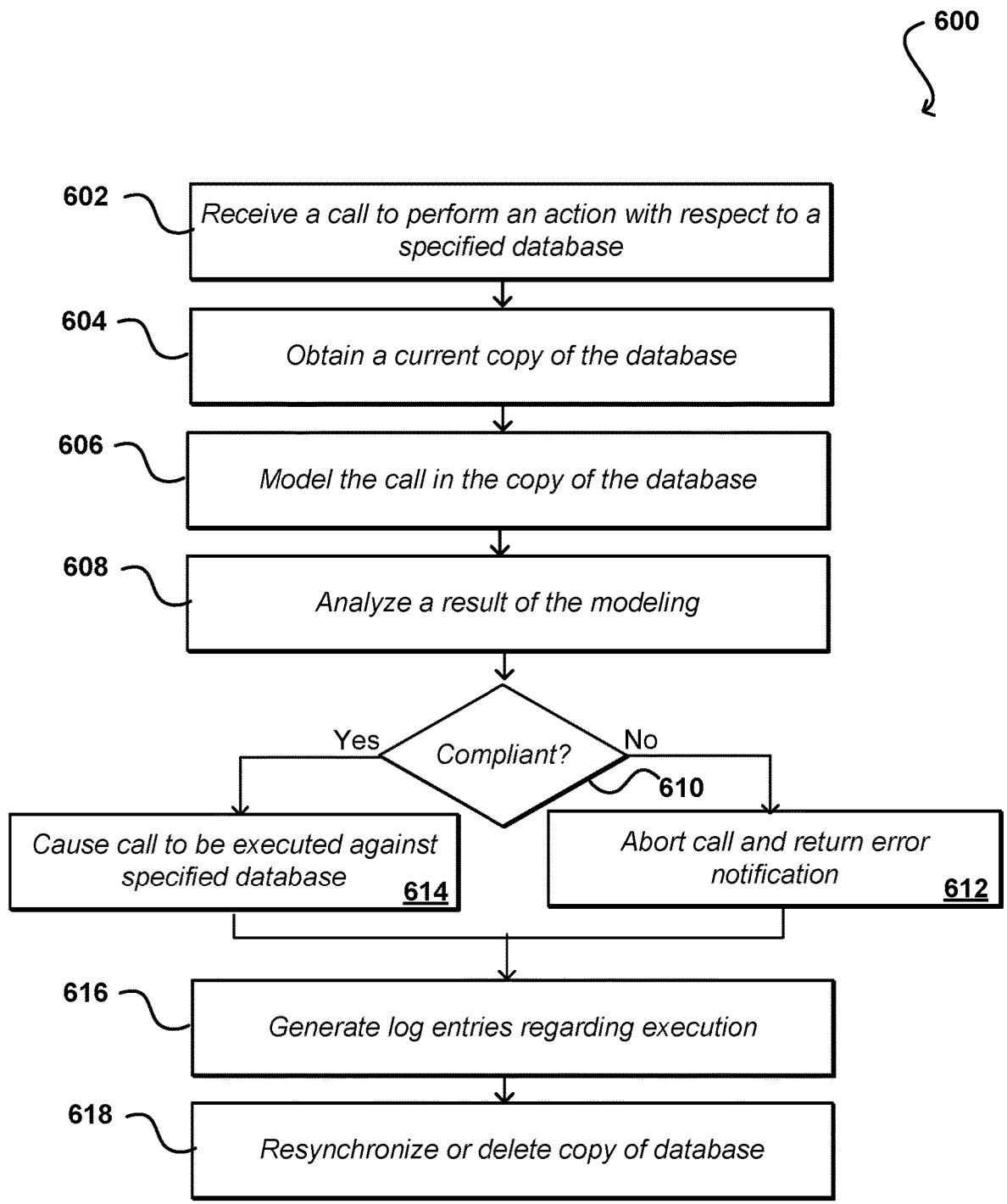
FIG. 6 illustrates an example process for testing requests to be performed against a database that can be utilized in accordance with various embodiments.

FIG. 6 illustrates an example process 600 for modeling a call in a copy of a database that can be utilized in accordance with various embodiments. It should be understood for this and other processes discussed herein that there can be additional, alternative, or fewer steps performed in similar or alternative orders, or in parallel, within the scope of the various embodiments unless otherwise stated. In this example, a call to perform one or more actions with respect to a specified database is received 602. This call in some embodiments can involve configuration changes to a target resource environment, where the configuration changes will be represented in a configuration management database or other such repository. In order to model the effects of the call, a current copy of the database can be obtained 604, either by generating a new copy or obtaining a synchronized copy, among other such options. The actions for the call can be modeled 606 in the shadow copy of the database. In some embodiments, this involves the contents of the API call being looked up in a table which maps them by their nature to the configuration changes which would result if the API call was executed, and these changes are then made to the shadow copy in a the modeling process. Results of the modeling can be produced, as may be written to a result log, configuration bucket, or other such location. A result of the modeling can be analyzed 608, such as by obtaining and analyzing the results stored to the designated location. This can include, for example, comparing the results against one or more rules, policies, requirements, regulations, or compliance criteria, among other such options. The analysis in some embodiments can include analyzing the entire modeled environment as reflected in the shadow copy, with the result recognizing that while the change may not itself be non-compliant in isolation, it may, if executed, act to make another part of the environment non-compliant.

A determination can be made 610 as to whether the results, with respect to the modeled environment, are in compliance with those rules or criteria, etc. If the result is not compliant, the call can be aborted 612 without ever being executed against the target environment, and an error notification generated and returned to a source of the call (or other indicated destination). In some embodiments the notification may include information about the non-compliance. If the results are determined to be compliant, the call can be caused 614 to be executed in the target environment. Regardless of the outcome, one or more log entries can be generated 616 regarding the execution, for auditing or other such purposes. The copy of the database can then be resynchronized 618 with the actual database for use in subsequent call testing, or the copy can be deleted with a new copy generated as needed for testing.

Figure 7:
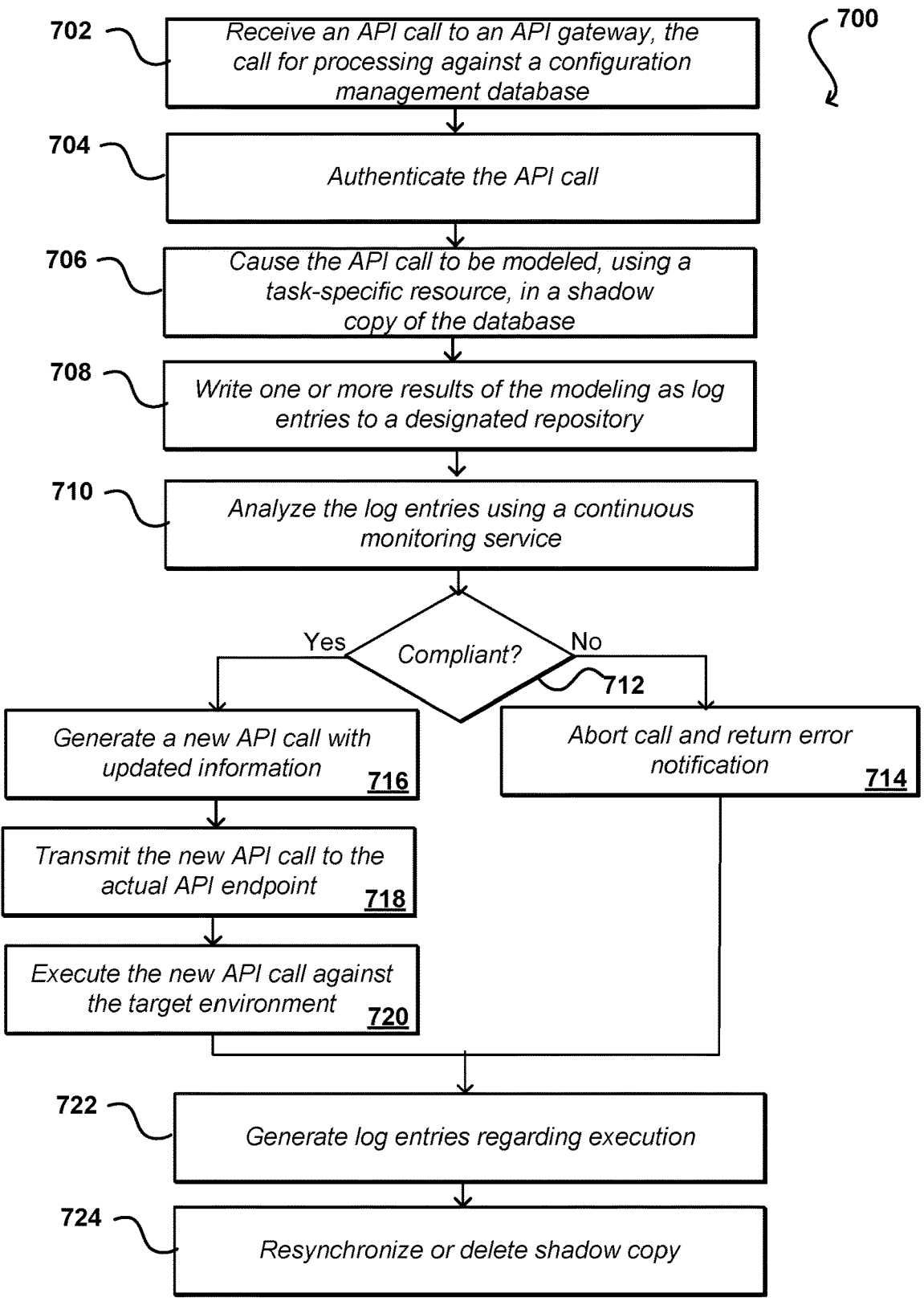
FIG. 7 illustrates an example process for ensuring compliance of a resource allocation that can be utilized in accordance with various embodiments.

FIG. 7 illustrates another example process 700 for modeling an API call before execution in a target environment that can be utilized in accordance with various embodiments. In this example an API call is received 702 to an API gateway, even though the API call is intended to be executed by an API endpoint for a target environment including a configuration management database. The API call can be authenticated 704 by the API gateway, and unpacked or otherwise processed as appropriate. The API can be caused 706 to be modeled in a shadow copy of the configuration management database. In this example, a task-specific resource is allocated for purposes of performing the modeling. As mentioned, the modeling can result in one or more configuration changes that would normally be reflected in the configuration management database, but for testing purposes can be reflected in the shadow database. One or more results of the modeling can be written 708 as log entries, or other records, to a designated repository, such as a configuration bucket. The log entries can then be analyzed 710 using a continuous monitoring service that monitors for compliance with one or more requirements or regulations.

A determination can be made 712 as to whether the changes are compliant with the requirements or regulations, based at least in part upon the analyzing of the log entries. If the changes are determined to not be in compliance, the API call can be aborted without being transmitted to the target environment and an error message or notification can be returned in response to the determined non-compliance. If the results are determined to be compliant, a new API call can be generated 716 with new information, such as a new API identifier and updated account information. The new API call can then be transmitted 718, by the same or a different task-specific resource, to the actual API endpoint for the target environment. The new API can then be executed 720 against the target environment using any of a number of different conventional approaches. The execution of the API call will also result in the configuration management database being updated to reflect the disposition of the environment, and this update occurs via the pre-existing standard mechanism for doing so. Regardless of the outcome, one or more log entries can be generated 722 regarding the execution, for auditing or other such purposes. The copy of the database can then be resynchronized 724 with the actual database for use in subsequent call testing, or the copy can be deleted with a new copy generated as needed for testing. A result of the processing can also be sent back to a source of the API call via the API gateway, or along another such path.

Figure 8:
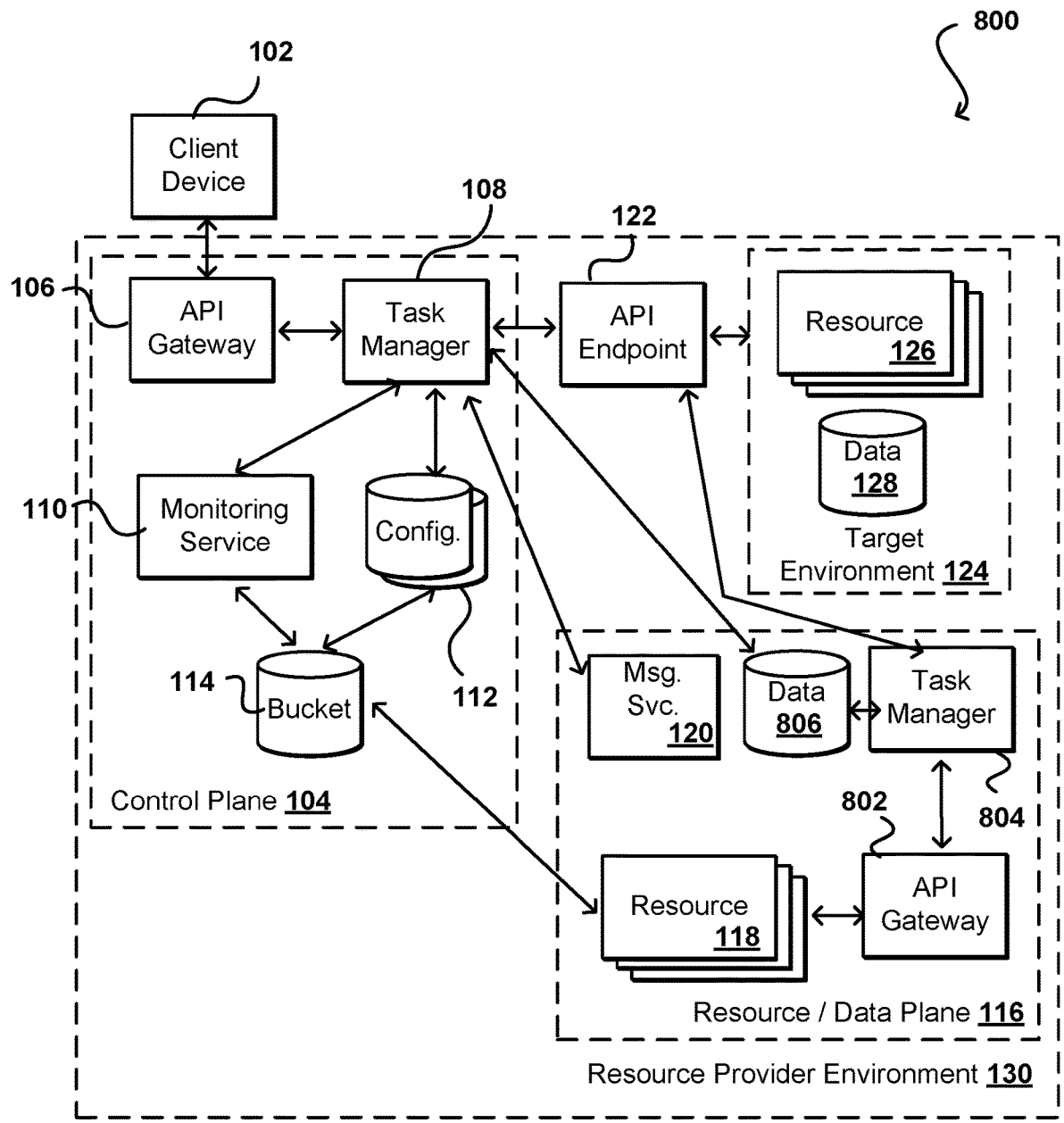
FIG. 8 illustrates another example system for ensuring compliance of a resource allocation that can be utilized in accordance with various embodiments.

FIG. 8 illustrates another example system for ensuring compliance of a resource allocation that can be utilized in accordance with various embodiments. Reference numbers will be carried over from FIG. 1 for similar elements for simplicity of explanation, but it should be understood that such usage is not intended as a limitation on the scope of the various embodiments unless otherwise specifically stated. The system in FIG. 1 addresses the scenario where the third-party compliance tools assess compliance by looking at log records and a configuration management database 112. Some tools directly query APIs to determine the disposition and configuration of assets, using calls such as "describe-subnets" either in addition to, or instead of, looking at a configuration management database. There can be an approach taken to deal with such a scenario as well.

The example system 800 illustrated in FIG. 8 expands on the description of FIG. 1. As with FIG. 1, a client device 102 using a command line interface or SDK, for example, can connect to an API Gateway 106. The client can have had its SDK modified so that the client device 102 believes the API Gateway 106 to be the target API endpoint. The client device 102 communicates with the API Gateway 106 and the API Gateway 106 verifies the client's authentication and authorization against a relevant policy, such as one for a front-end account. The API call can be unpacked and the call details logged as discussed elsewhere herein. The API call is then passed to the task manager 108. The task manager can allocate one or more task-based resources to catch API call GET and POST requests made by clients. This resource can run with an identity role, discussed elsewhere herein, which grants it write permissions on the bucket 114 and database tables 806 and the ability to synthesize and make API calls to the target API endpoint 122 for the service or services it is proxying. As opposed to the system of FIG. 1, this system can handle more complex matters of compliance assessment than can be achieved with the previously described treatment of simple string-matching. In some embodiments the database 806 can serve the function of the shadow copy previously described.

Continuous monitoring tools such as those described above monitor log and event data, among other such relevant data sources, for logs of API calls executed and the changes in environment configuration that result from them. The data can include information such as API calls made, details and credentials of who made them, and a timestamp; they are not cryptographically signed or otherwise authenticated as originating from specific services. The task-based resources can then synthesize records of the same formats to represent initial events which would occur in the event that the API call request made was to be executed. If the task-based resource synthesizes such "shadow" log records as would be created in the event of the API call being filtered being made, and puts them in a bucket 114 as though they had been created by actual log sources, then the customer's continuous monitoring tools running on allocated resources 118 that they manage, can ingest and analyze the shadow log records as though the API call being filtered has succeeded, and therefore feed back to the task manager 108 via a messaging service 120 whether a compliance breach would or would not occur, before the API call is actually executed.

If the continuous monitoring tools raise an alert via a mechanism such as the messaging service 120 which can be read by the task manager 108, then the task manager will know that the API call being filtered should not be allowed to succeed and therefore can reject it with an http 403 response (potentially including an error string from the post made by the compliance tool) rather than executing it against assets in the account for the target resources 126. Continuous monitoring tools are available from a number of third parties, or customers can opt to build their own; they can operate via a number of possible mechanisms. They may poll or react to writes of log files to a bucket 114 to which they have read access, they may read the configuration service database, or they may make periodic API calls of their own to poll the state of the target environment. In this example the shadow copy can be used for the scenario where the compliance tools running on the resources 118 choose to also examine environment compliance by directly querying the environment state using API calls. An SDK running on the resources 118 can have has its mapping of API endpoints to their fully qualified domain names modified to point to API gateways 802 rather than actual API endpoints. Therefore, when compliance tools make API calls to query the state of the environment, these calls are authenticated and unpacked by API gateways 802 and processed by task-based resources, which if the API calls match to the syntax of calls which query the disposition of the environment, query the shadow copy 806 and synthesize responses which reflect the environment as simulated in the configuration management database 112. If the API calls are of a different nature which are intended to act on the environment rather than query its nature, they may be blocked with a 403 response or acted upon by the task-based resources synthesizing new API calls and executing them via API endpoints 122 against the resource account, such as by using cross-account privileges granted in a specified identity management role.

Figure 9:
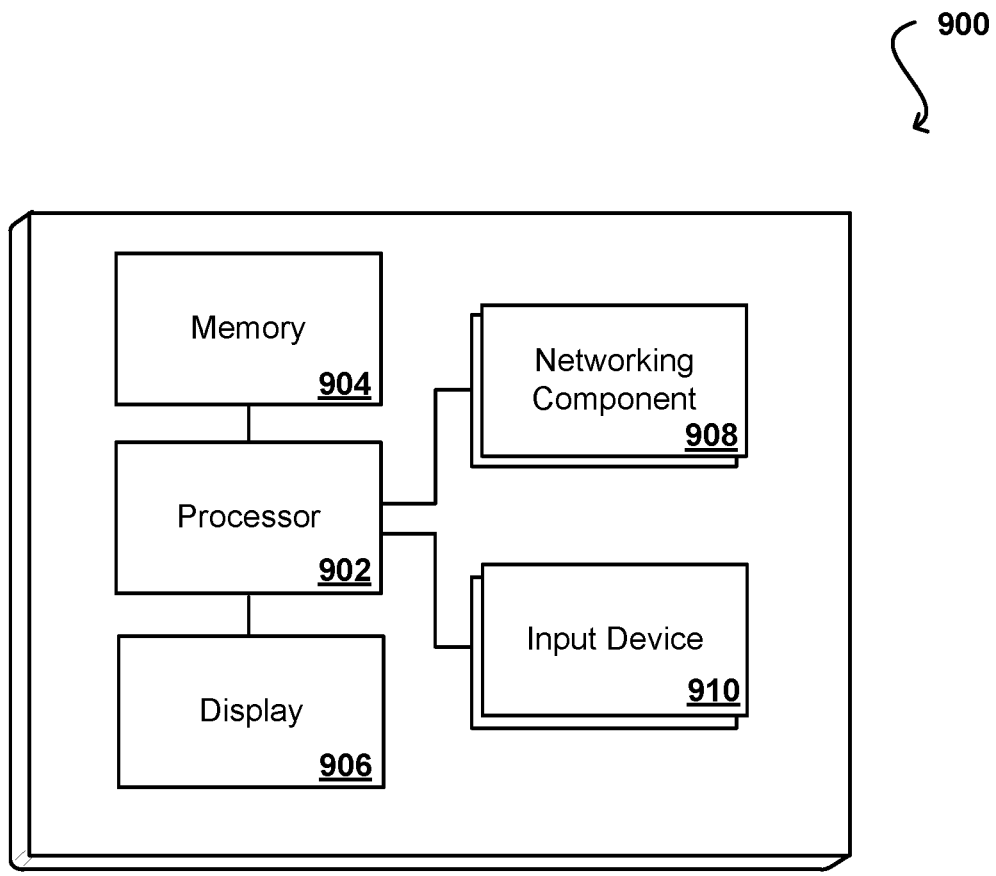
FIG. 9 illustrates example components of a computing device that can be used to implement aspects of the various embodiments.

FIG. 9 illustrates a set of basic components of an example computing device 900 that can be utilized to implement aspects of the various embodiments. In this example, the device includes at least one processor 902 for executing instructions that can be stored in a memory device or element 904. As would be apparent to one of ordinary skill in the art, the device can include many types of memory, data storage or computer-readable media, such as a first data storage for program instructions for execution by the at least one processor 902, the same or separate storage can be used for images or data, a removable memory can be available for sharing information with other devices, and any number of communication approaches can be available for sharing with other devices. The device may include at least one type of display element 906, such as a touch screen, electronic ink (e-ink), organic light emitting diode (OLED) or liquid crystal display (LCD), although devices such as servers might convey information via other means, such as through a system of lights and data transmissions. The device typically will include one or more networking components 908, such as a port, network interface card, or wireless transceiver that enables communication over at least one network. The device can include at least one input device 910 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or notebook computers running a standard operating system, as well as cellular, wireless and handheld devices running mobile software and capable of supporting a number of networking and messaging protocols. Devices capable of generating events or requests can also include wearable computers (e.g., smart watches or glasses), VR headsets, Internet of Things (IoT) devices, voice command recognition systems, and the like. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving an application programming interface (API) call to modify a configuration for a resource environment, information for the configuration stored to a configuration management database;
   causing the API call to be modeled in a second database, the second database being a synchronized copy of the configuration management database;
   analyzing one or more changes to the second database, resulting from modeling of the API call, to determine whether the changes satisfy a compliance requirement; and
   transmitting a second API call to an API endpoint associated with the configuration management database if the one or more changes satisfy the compliance requirement, the second API call to modify the configuration for the resource environment, and causing the second API call to be executed in a target environment, the configuration management database being updated to reflect a resulting disposition of the target environment.

2. The computer-implemented method of claim 1, further comprising:
aborting the API request if the one or more changes to the second database do not satisfy the compliance requirement; and
notifying a source of the API request of the aborting.

3. The computer-implemented method of claim 1, further comprising:
resynchronizing the second database with the configuration management database after the analyzing of the one or more changes.

4. The computer-implemented method of claim 1, further comprising:
receiving the API call to an API gateway of the resource environment, wherein neither the API call nor the second API call are received by the API endpoint associated with the configuration management database unless the one or more changes to the second database satisfy the compliance requirement.

5. The computer-implemented method of claim 1, further comprising:
generating at least one log record corresponding to the one or more changes, wherein analyzing the one or more changes includes parsing information contained within the at least one log record.

6. A computer-implemented method, comprising:
creating a copy of a database;
modeling effects of execution of an application programming interface (API) call using the copy of the database;
determining whether the API call causes environment state information in the copy of the database to be out of compliance;
indicating to a user that the API call would result in a non-compliance if the environment state information is determined to be out of compliance in response to modeling the API call; and
executing the API call in a target environment, including the database, if the environment state information is determined to be in compliance in response to modeling.

7. The computer-implemented method of claim 6, further comprising:
receiving the API call to an API gateway configured to authenticate the API call and cause effects of execution of the API call to be modeled in the copy of the database.

8. The computer-implemented method of claim 6, further comprising:
determining that the API call includes at least one action to modify a configuration of a resource environment, the database being a configuration management database for storing information about the configuration; and
allocating a resource to model effects of execution of the at least one action in the copy of the database.

9. The computer-implemented method of claim 6, further comprising:
sending the API call to an actual API endpoint associated with the database if the environment state information is determined to be in compliance.

10. The computer-implemented method of claim 6, further comprising:
generating at least one log entry corresponding to a change in configuration resulting from modeling the API call; and
analyzing the at least one log entry using a continuous monitoring service to determine whether the environment state information is out of compliance.

11. The computer-implemented method of claim 10, further comprising:
determining whether the environment state information is out of compliance at least in part by comparing information in the at least one log entry against one or more compliance criteria.

12. The computer-implemented method of claim 6, further comprising:
authenticating the API call against a customer account before modeling the API call.

13. The computer-implemented method of claim 6, further comprising:
modifying a delivery of the API call by setting an entry in an API endpoint-to-domain name service (DNS) lookup table.

14. The computer-implemented method of claim 6, further comprising:
resynchronizing the copy of the database with the database for subsequent modeling.

15. A system, comprising:
at least one processor; and
memory including instructions that, when executed by the at least one processor, cause the system to:
create a copy of a database;
model effects of execution of an application programming interface (API) call using the copy of the database;
determine whether the API call causes environment state information in the copy of the database to be out of compliance;
indicate to a user that the API call would result in a non-compliance if the environment state information is determined to be out of compliance in response to modeling the API call; and
execute the API call in a target environment, including the database, if the environment state information is determined to be in compliance in response to modeling.

16. The system of claim 15, wherein the instructions when executed further cause the system to:
determine that the API call includes at least one action to modify a configuration of a resource environment, the database being a configuration management database for storing information about the configuration; and
allocate a resource to model effects of execution of the at least one action in the copy of the database.

17. The system of claim 15, wherein the instructions when executed further cause the system to:
receive the API call to an API gateway configured to authenticate the API call and cause effects of execution of the API call to be modeled in the copy of the database.

18. The system of claim 15, wherein the instructions when executed further cause the system to:
send the API call to an actual API endpoint associated with the database if the environment state information is determined to be in compliance.

19. The system of claim 15, wherein the instructions when executed further cause the system to:

generate at least one log entry corresponding to a change in configuration resulting from modeling the API call; and analyze the at least one log entry using a continuous monitoring service to determine whether the environment state information is out of compliance.

20. The system of claim 15, wherein the instructions when executed further cause the system to:

determine whether the environment state information is out of compliance at least in part by comparing information in the at least one log entry against one or more compliance criteria.

\* \* \* \* \*